United States Patent [19]

Banner

[11] 3,971,151
[45] July 27, 1976

[54] FISHING HOOK HOLDING MEANS
[76] Inventor: Philip M. Banner, 28 Oxford Road, Massapequa, N.Y. 11758
[22] Filed: Jan. 16, 1975
[21] Appl. No.: 541,656

Related U.S. Application Data
[63] Continuation-in-part of Ser. No. 440,991, Feb. 11, 1974, abandoned.

[52] U.S. Cl. .................................. 43/24; 43/25.2
[51] Int. Cl.² ................... A01K 87/04; A01K 97/06
[58] Field of Search .............. 43/24, 25, 25.2, 18

[56] References Cited
UNITED STATES PATENTS

| 1,662,983 | 3/1928 | Pflueger | 43/25.2 |
| 2,556,403 | 6/1951 | Sokolik | 43/25.2 |
| 2,781,602 | 2/1957 | Warford | 43/24 |
| 3,815,273 | 6/1974 | Perkins | 43/25.2 |
| 3,839,811 | 10/1974 | Hopkins | 43/25.2 |

*Primary Examiner*—Warner H. Camp

[57] ABSTRACT

A fishing hook holding means and new fishing line guides with attachments designed to accomplish locking a fishing hook in a fixed locked position when out of use and affording new methods of installing line guides on fishing poles and outriggers.

6 Claims, 12 Drawing Figures

FISHING HOOK HOLDING MEANS

This patent application is a continuation in part of serial number 440,991 filed Feb. 11, 1974 and now abandoned.

BACKGROUND OF THE INVENTION

Fish hook holding means are commonly needed on any fishing pole while out of use to safeguard that the hook will not cause an accident to a fisherman. Fishing rods on a boat in transit present a danger because the pitch and roll of a craft moves the line and hooks about in such a manner that it is difficult to avoid an accident. Statistics of yearly hook handling accidents on lakes, rivers and ocean fishing show an alarming need for safety devices to control the modern use of hooks that is accomplished by this invention. The present invention shows new methods of attaching said fishing rod hook holding means by themselves onto fishing poles while it also teaches the combined use of hook holders and line guides together in one unit, in various configurations. This invention also teaches new methods of securing fishing line guide attachments onto fishing poles and to outriggers that will change and simplify the installation of all line guides and provide necessary utility to poles needing such repairs where a guide attachment for lines or hook holding means can readily be installed in minutes as opposed to the method of having to wrap and lay lines to hold guides, as further explained and shown in this application.

SUMMARY OF THE INVENTION

Fishing line guides are shown in the drawings that feature fishing hook holding and locking means attached to the guides to accommodate the locking of hooks in a fixed position. Other attachments are shown having both a hook lock and line guide where they appear in a preferred illustrated position opposite each other as separate units. In another embodiment the locks show the presence of resilient material beneath the lock that serves to embed the hooks while providing a pressurized substance beneath the hook to hold it in place safely. A hook holding sleeve, shown in circular design for illustration, having an insert of resilient materials provides hook holding means on its periphery while it also shows a line guide attached to it for greater utility providing in combination a new hook and line holder assembly. Another model shows magnetic means within the hook holding means having, for example, a lamination of plastic to keep it from rusting which attracts magnetic composition materials in hooks that would be attracted by and hold to this fishing hook holder lock. Other advantages, which are numerous are found in versatile rotatable locks for fishing hooks that have more than one position, and of course the many new bracket quick attachment means in the form of new methods of attaching line guides on old and new fishing poles and outriggers that need not be locked on with lays of line by adaptation of these brackets. The use of old locking on methods for these new fishing hook locks and the new line guides or any combination thereof is also shown so that the user can take his preference. The teaching of the use of new brackets in the form of many kinds of clamps and locks and new guides and new fishing hook holders described in this patent specification, drawings and claims will provide a new necessary form of safety to a leisure sport that at times causes unnecessary accidents.

OBJECTS OF THE INVENTION

Accordingly a principal object of the invention is to provide new and improved fishing hook holding means for fishing poles and outriggers.

Another object of the invention is to provide new and improved fishing line guides having new means of attachment to fishing poles and to related equipment.

Another object of the invention is to provide new and improved fishing hook holders attached to fishing line guides in one combined integral unit.

Another object of the invention is to provide fishing line guides and fishing hook holders having means to rotate on a shaft so that the guides and holders can be positioned in other than a fixed position if desired.

Another object of the invention is to provide new fishing hook holders having magnetic qualities protected from hazards by a coating that will hold magnetic metals that most hooks are made of.

Another object of the invention is to provide new and improved fishing line guides having built in fishing hook locking means.

Another object of the invention is to provide new methods of using bracket and clamping attachment means to place line guides and fishing hook locking means on fishing poles and on outriggers.

Another object of the invention is to provide a new method of providing resilient material within a fishing hook lock that will provide pressure and embed the hook properly in a fixed position.

BRIEF DESCRIPTION OF THE DRAWINGS

These and other objects of the invention will be apparent from the following specifications and drawings in which.

DESCRIPTION OF THE PREFERRED EMBODIMENTS

Figure 1:
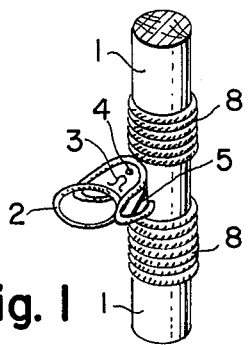
FIG. 1 is a front view of a fishing line guide having hook holding means.

FIG. 1 shows a fishing rod 1 having a fishing line guide 2 with hook holding means 3 & 4 comprising resilient material 5 within it to hold a fishing hook, the line guide 2 is locked on the pole 1 with securing means 8. A small hook can be inserted into holding means 4 or a larger hook placed into holding means 3 and by placing the point of the hook into the locking means 3 & 4 it will then stay fixed in one position.

Figure 2:
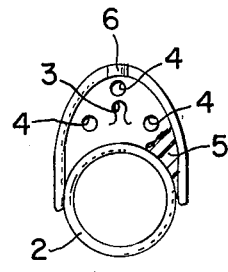
FIG. 2 is a top plan view of a fishing line guide having hook holding means.

FIG. 2 shows a top plan view of a guide 2 showing a cutaway depth view having resilient material 5 to embed and lock a hook, having a guide support 6 and hook holding means 3 & 4 for locking hooks.

Figure 3:
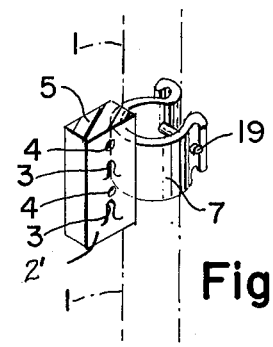
FIG. 3 is a side view of a hook holder means with clamp on attachment.

FIG. 3 shows a pole 1 having an adjustable attached bracket 7 with an adjustable screw 19 and having a rectangular attached hook holding device 2' that secures hooks by locking them into the provided hook holding means 3 & 4. The hook holding device 2' has a cross section of resilient material 5 that would embed a hook and keep pressure against the hook inside the device 2'.

Figure 4:
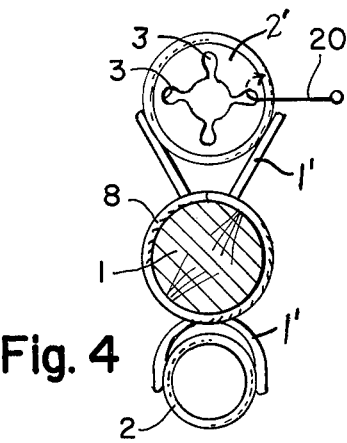
FIG. 4 is a top plan view of a fishing line guide and a fishing hook holder attached to a fishing pole.

FIG. 4 shows a top view of a pole 1 having a line guide 2 on one side and a hook holding device 2' on the other side held by brackets 1' together. Fish hook holding means 3 shows a hook 20 being held in place and pole locking means 8 fastens the guide 2 and hook locking device 2' in place on a pole 1.

Figure 5:
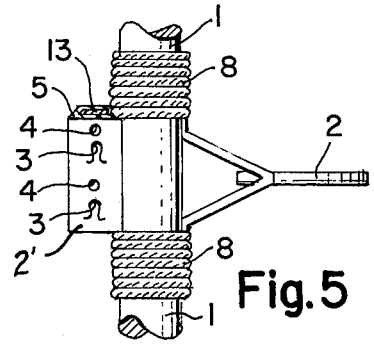
FIG. 5 is a front view of another fishing hook holder attached to a fishing pole and a line guide also attached to a pole.

FIG. 5 shows a fishing pole 1 having a line guide 2 on one side and a hook locking device 2' on the other side both secured by pole locking means 8, and a cross section of resilient material 5 having within the material 5 a magnet 13 which is covered from weather and hazards to hold hooks made of magnetic properties. It also shows hook holding means 3 & 4 where several hooks can be held in a fixed position.

Figure 6:
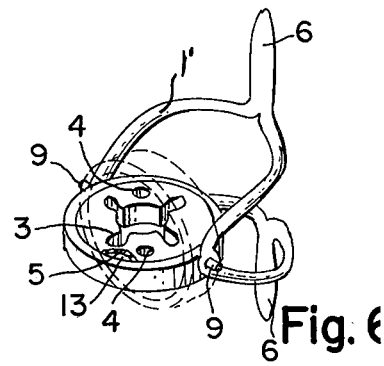
FIG. 6 is a front view of a rotatable fishing hook holder being adjustable to many positions.

FIG. 6 shows a combination fishing line guide and fishing hook locking device having hook locking means 3 & 4 formed in resilient material 5 and is solidly made so that it rotates with a shaft 9 journaled on brackets 1' supported by feet 6 allowing the device to move as needed. It also shows a covered magnet 5.

Figure 7:
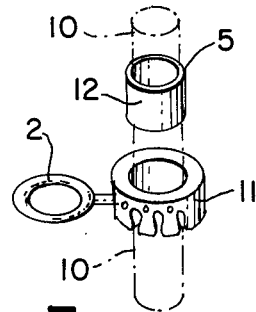
FIG. 7 is a front view of a circular fishing hook holder having resilient material to lock a hook into and illustrating an attached line guide.

FIG. 7 shows the inside sleeve 12 that fits into a fishing hook circular holder 11 which has an attached line guide 2 and the sleeve 12 is made with resilient material 5 fitting over a fishing rod 10.

Figure 8:
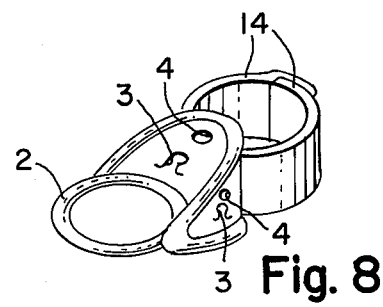
FIG. 8 is a front view of a line guide with hook holding means showing an adjustable clamp means for attachment.

FIG. 8 shows a line guide 2 having attached to it hook holding means 3 & 4 for attachment to fishing poles by means of a snap clamp 14 which holds the line guide 2 and fishing hook lock device 2'.

Figure 9:
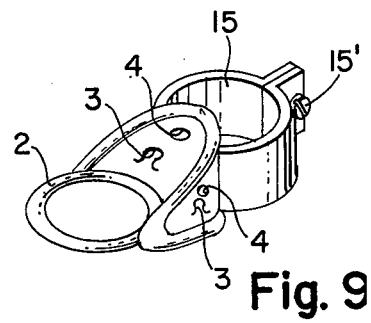
FIG. 9 is a front view of another line guide showing new adjustable securing means for attachment to fishing poles.

FIG. 9 shows a line guide 2 having attached to the guide fish hook holding means 3 & 4 that is secured to a clamp 15 having a locking screw 15' that adjusts the clamp to more than one size pole.

Figure 10:
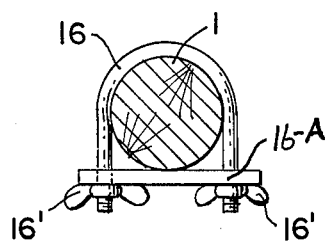
FIG. 10 is a top view of a clamping means for attachment of fishing hook holders and line guides to fishing poles.

FIG. 10 shows the fishing pole 1 within a double U-shaped lock 16 having a locking bracket 16-A held by locking nuts 16' and showing the threaded ends of the U-shaped lock.

Figure 11:
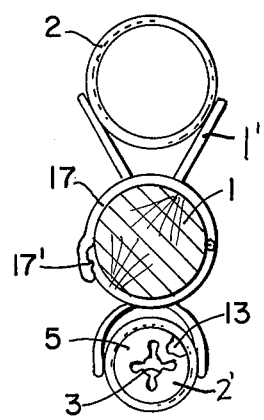
FIG. 11 is a top plan view of a line guide and a hook holder having hinged locking means for fishing pole attachment and for outriggers as well.

FIG. 11 shows the combination of a fishing line guide 2 and a fishing hook locking device 2' both attached by brackets 1' to a circular hinged band 17 shown attached to a fishing pole 1 and having a locking means 17' that locks the clamp 17 to the pole 1. The hook locking device 2' is provided with a magnet 13 embedded in resilient material 5 and has hook holding means 3 formed therein.

Figure 12:
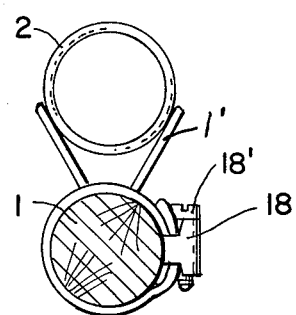
FIG. 12 is a top plan view of a fishing pole clamp for line guides and hook hoding means on fishing poles and outriggers.

FIG. 12 shows a fishing pole 1 having a circular clamp 18 that is adjustable by a screw 18' so that various sizes of fishing poles 1 can receive this clamp 18 to replace guides 2 or for attaching fish hook locking devices 2' onto poles, and also shows the guide bracket.

The various combinations of the illustrated devices clearly show new methods for attaching fishing line guides to fishing poles that will no longer require the tedious art of wrapping line on brackets to secure them. The use of quick connect brackets or adjustable brackets in combination with line guides that have built in hook holding means or separate hook holders provide new methods for attaching necessary safety devices to fishing poles. The use of hidden magnets that are covered to protect them from the environment will also assist in holding hooks in place by magnetic attraction of the metals.

The operation of using a fishing hook is rather simplified, the user places the hook into the provided hook holding means shown which is then kept in position by the snug fit of the hook holder shown having a U shape 3 so that various sizes of hooks can be accommodated. Another holder is shown with a small circular hole 4 that will also take an inserted hook and hold it firmly. A larger hook can be inserted into the larger hole and the smaller hole would be so placed to afford that the end of the inserted hook would be seen or come out of the smaller end. The various brackets can be made to have side hook holders which will preserve space where necessary and give the user places to lock more hooks. The resilient material mentioned will keep the necessary pressure against the hook and it acts as an insert in those models that are made with it.

From the foregoing description of the invention it will be apparent that a Fishing Hook Holding Means having unique characteristics is provided. While it has been shown and described, it will be apparent to those skilled in the art that changes may be made without departing from the principles and spirit of the invention, the scope of which is defined in the appended claims. Accordingly, the foregoing embodiments are to be considered illustrative rather than restrictive of the invention, and those modifications which come within the meaning and range of equivalency of the claims are included therein.

I claim:

1. A combination fishing pole line guide and fishhook holder comprising an annular member having a central opening of a size to securely grip a fishing rod section, bracket means attached to the outer peripheral surface of said annular member and radiating outwardly therefrom, a circular line guide secured to said bracket means in spaced relation to said annular member, and a fishhook retaining member secured to said bracket means, said fishhook retaining member including a body portion formed from resilient material and having apertures formed therein of a size to resiliently receive and secure a portion of a fishhook.

2. A fishing line guide and fishhook holder as in claim 1, wherein said line guide and said fishhook retaining member are positioned on diametrically opposite sides of said annular member.

3. A fishing line guide and fishhook holder as in claim 1, wherein said line guide and said fishhook retaining member extend from said annular member in the same direction.

4. A fishing line guide and fishhook holder as in claim 1, including a magnet embedded in said resilient body portion of said fishhook to further secure said fishhook.

5. A fishing line guide and fishhook holder as in claim 1, wherein said annular member is formed from semi-annular sections pivotally joined at one of their ends and provided with cooperating latch means at their other ends for assembly about said fishing rod section.

6. A fishing line guide and fishhook holder as in claim 1, including means to adjust the size of said central opening in said annular member to accommodate rod sections of various sizes.

* * * * *